United States Patent
Sotiriou et al.

(10) Patent No.: US 12,097,779 B2
(45) Date of Patent: Sep. 24, 2024

(54) RELATIVE POSE DETERMINATION OF PRIMARY AND SECONDARY WINDING STRUCTURES IN INDUCTIVE POWER TRANSFER SYSTEM

(71) Applicants: IPT Technology GmbH, Efringen-Kirchen (DE); Fraunhofer Gesellschaft zur Förderung der angewandten Forschung e.V., Munich (DE)

(72) Inventors: Sotirios Sotiriou, Mannheim (DE); Daniel Cichon, Breitengüßbach (DE); Tobias Dräger, Baiersdorf (DE)

(73) Assignees: IPT Technology GmbH, Efringen-Kirchen (DE); Fraunhofer Gesellschaft zur Förderung der angewandten Forschung e.V., Munich (DE)

( * ) Notice: Subject to any disclaimer, the term of this patent is extended or adjusted under 35 U.S.C. 154(b) by 365 days.

(21) Appl. No.: 17/704,846

(22) Filed: Mar. 25, 2022

(65) Prior Publication Data

US 2022/0212556 A1    Jul. 7, 2022

Related U.S. Application Data

(63) Continuation of application No. PCT/EP2020/076889, filed on Sep. 25, 2020.

(30) Foreign Application Priority Data

Sep. 26, 2019   (GB) ..................... 1913855

(51) Int. Cl.
*G01S 5/04* (2006.01)
*B60L 53/124* (2019.01)
(Continued)

(52) U.S. Cl.
CPC ............. *B60L 53/38* (2019.02); *B60L 53/124* (2019.02); *B60L 53/37* (2019.02); *G01S 5/0284* (2013.01);
(Continued)

(58) Field of Classification Search
CPC ........ G01S 5/04; G01S 5/0294; G01S 5/0284; B60L 53/38; B60L 53/37; B60L 53/124;
(Continued)

(56) References Cited

U.S. PATENT DOCUMENTS

2013/0193276 A1    8/2013  Shapory
2015/0175025 A1    6/2015  Barbul et al.
(Continued)

FOREIGN PATENT DOCUMENTS

| CA | 3031276 A1 | * | 8/2019 | ............. G01C 25/00 |
| CN | 110274588 A | * | 9/2019 | ............. G01C 21/00 |

(Continued)

OTHER PUBLICATIONS

Japanese Patent Office, Notice of Reasons for Refusal for JP application No. 2022-518937, dated Sep. 19, 2023.
(Continued)

*Primary Examiner* — Harry K Liu
(74) *Attorney, Agent, or Firm* — Miller Johnson (57) ABSTRACT

A method is disclosed for determining a relative pose between a primary winding structure and a secondary winding structure of a system for inductive power transfer to a vehicle. The method includes obtaining first output values generated by multiple receiving devices of a first radio direction finding system. The first radio direction finding system further includes a transmitting device. The receiving devices generate the output values in response to receiving a position signal transmitted by the transmitting device. The method includes determining a motion value of the vehicle.

(Continued)

The method includes providing the obtained first output values and the motion value as input values to a model. The method includes determining a first relative pose based on the model. The method includes determining the relative pose based on the first relative pose.

18 Claims, 3 Drawing Sheets

(51) Int. Cl.
    *B60L 53/37*     (2019.01)
    *B60L 53/38*     (2019.01)
    *G01S 5/02*     (2010.01)
    *H02J 50/10*     (2016.01)
    *H02J 50/40*     (2016.01)
    *H02J 50/60*     (2016.01)
    *H02J 50/90*     (2016.01)

(52) U.S. Cl.
    CPC .............. *G01S 5/0294* (2013.01); *G01S 5/04* (2013.01); *H02J 50/10* (2016.02); *H02J 50/40* (2016.02); *H02J 50/60* (2016.02); *H02J 50/90* (2016.02); *B60L 2240/12* (2013.01); *B60L 2240/24* (2013.01); *B60L 2240/32* (2013.01)

(58) Field of Classification Search
    CPC .. H02J 50/90; H02J 50/10; H02J 50/40; H02J 50/60
    USPC ......................................................... 342/451
    See application file for complete search history.

(56) References Cited

U.S. PATENT DOCUMENTS

| | | | |
|---|---|---|---|
| 2018/0236886 | A1 | 8/2018 | Glaenzer et al. |
| 2018/0309323 | A1* | 10/2018 | Klingspor ................ H04B 5/79 |
| 2019/0058362 | A1 | 2/2019 | Klingspor et al. |
| 2019/0248245 | A1 | 8/2019 | Golgiri |

FOREIGN PATENT DOCUMENTS

| | | | |
|---|---|---|---|
| DE | 102013208678 A1 | 11/2014 | |
| DE | 102013110280 A1 | 3/2015 | |
| DE | 102016014962 A1 | 7/2017 | |
| EP | 2789495 A1 | 10/2014 | |
| GB | 2542182 A | 3/2017 | |
| JP | 2007333385 A1 | 12/2007 | |
| JP | 2018533339 A | 11/2018 | |
| WO | 2012047779 A | 4/2012 | |
| WO | 2013116232 A | 8/2013 | |
| WO | 2014095722 A | 6/2014 | |
| WO | 2014183926 A | 11/2014 | |
| WO | WO-2017172778 A1 * | 10/2017 | ........... G01C 21/165 |
| WO | WO-2018189529 A1 * | 10/2018 | ........... G01S 5/0027 |
| WO | 2019072699 A | 4/2019 | |

OTHER PUBLICATIONS

European Patent Office, Office Action for EP application No. 20780688.6, dated Sep. 13, 2023.

* cited by examiner

RELATIVE POSE DETERMINATION OF PRIMARY AND SECONDARY WINDING STRUCTURES IN INDUCTIVE POWER TRANSFER SYSTEM

CROSS-REFERENCE TO RELATED APPLICATIONS

This application is a continuation of International Application No. PCT/EP2020/076889 filed Sep. 29, 2020, which claims priority to GB Application No. 1913855.1 filed Sep. 26, 2019. The entire disclosures of the above applications are incorporated by reference.]

FIELD

The present disclosure relates to a system and a method for determining a relative pose between a primary winding structure and a secondary winding structure of a system for inductive power transfer.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The document GB 2542182 A discloses a system for determining a relative position and orientation between a primary and a secondary winding structure of a system for inductive power transfer, in particular to a vehicle.

It is desirable to position the vehicle in a so called charging pose (charging position and/or orientation), wherein a desired, e.g. maximized, amount of power can be transferred, in particular with the best possible efficiency. In order to position the vehicle in such a charging pose, it is desirable to provide information on an actual relative pose to the driver of the vehicle, e.g. by displaying such information on a vehicle-sided display. In particular during the final phase of the vehicle approach towards charging unit, it is usually not possible for the driver to visually determine said relative pose.

It is possible that changing environmental influences affect the relative pose determination in an undesired way, e.g. because an accuracy is decreased. Thus, a result of the relative pose determination can change due to changing environmental influences although the real relative pose doesn't change. The method described in GB 2542182 A, for example, relies on the evaluation of transmitted signals, wherein these signals are no data signals, i.e. do not encode data. In particular, a signals are received by a receiver, wherein the receiver generates a voltage depending on the received signal, wherein the voltage level is evaluated in order to determine the relative pose. These signals can e.g. disturbed by environmental influences such as metal objects or ferromagnetic material such as ferro-concrete and other kind of influences. Further, said influences may change over lifetime of the system for inductive power transfer.

Further known is WO 2019/072699 which discloses a system and a method for determining a relative pose between a primary winding structure and a secondary winding structure of a system for inductive power transfer.

WO2014/095722 A2 discloses an inductive sensing system with multiple detection windings.

WO 2012/047779 A1 discloses a safety system for a charger to provide protection with respect to an object that may become hot during operation of the charger, wherein the safety system comprises a detection subsystem configured to detect presence of the object and substantial proximity to the charger and a notification subsystem operatively coupled to the detection subsystem and configured to provide an indication of the object. The publication discloses that one or more inductive sensors can be integrated into a source device, source housing, vehicle, or surrounding area to detect obstructions and foreign objects and/or materials between the source and device resonators.

BRIEF SUMMARY

There is the technical problem to provide an alternative system and an alternative method for determining a relative pose between a primary and a secondary winding structure of an inductive power transfer system, wherein inaccuracies in the relative pose determination due to environmental influences are minimized.

The solution to said technical problem is provided by the subject-matter with the features of the independent claims. Further advantageous embodiments are provided by the subject-matter with the features of the subclaims.

A method for determining a relative pose between a primary winding structure and a secondary winding structure of a system for inductive power transfer to a vehicle is proposed.

The system for inductive power transfer can comprise a primary unit with the primary winding structure and a secondary unit with the secondary winding structure. The vehicle can comprise the secondary unit with the secondary winding structure for receiving an alternating electromagnetic field which is generated by the primary winding structure of the primary unit. The primary winding structure generates the alternating electromagnetic field if the primary winding structure is energized or supplied with operating current. The primary unit can comprise a totality or a subset of components by which an alternating electromagnetic field for inductive power transfer is generated. Correspondingly, the secondary unit can comprise a totality or a subset of components by which the alternating electromagnetic field for inductive power transfer is received and a corresponding output voltage is provided.

The primary unit can be provided by an inductive power transfer pad. An inductive power transfer pad can be installed on the surface of a route or a parking space or it can be integrated within such a surface.

The present invention can be applied in particular to the field of inductive energy transfer to any land vehicle, for example track bound vehicles, such as rail vehicles (e.g. trams). In particular, the invention relates to the field of inductive energy transfer to road automobiles mobiles, such as individual (private) passenger cars or public transport vehicles (e.g. busses).

In the following, reference can be made to a primary-sided coordinate system and a secondary-sided coordinate system. The primary-sided coordinate system can be a coordinate system of the primary winding structure, wherein the secondary-sided coordinate system can be a coordinate system of the secondary winding structure.

The primary-sided coordinate system can comprise a first axis, which can also be referred to as longitudinal axis, wherein the first axis can be a longitudinal axis of the primary winding structure or extend parallel to that axis. A second axis, which can also be referred to as lateral axis, can be a lateral axis of the primary winding structure or extend parallel to that axis. A third axis, which can also be referred to as a vertical axis, can be oriented perpendicular to the first and the second axes. The third axis can be oriented parallel to a desired direction of power transfer, i.e. from the primary unit to the secondary unit. The vertical axis can be oriented from bottom to top if pointing from the primary unit to the secondary unit.

The secondary-sided coordinate system can also comprise a first axis, which can be referred to as longitudinal axis, wherein the first axis can be a longitudinal axis of the secondary winding structure or extend parallel to that axis. A second axis of the secondary winding structure can be referred to as lateral axis, wherein the second axis can be a lateral axis of the secondary winding structure or can extend parallel to that axis. A third axis can be referred to as a vertical axis of the secondary winding structure and can be oriented perpendicular to the first and the second axes of the secondary winding structures. The third axis of the secondary winding structure can be oriented parallel to the desired direction of power transfer.

In the following, a length can be measured along the first axis, a width can be measured along the second axis and a height can be measured along the third axis. Directional terms referring to a direction such as "above", "under", "ahead", "beside" can relate to the aforementioned longitudinal, lateral and vertical axes of the respective coordinate system.

An origin of the primary-sided coordinate system can correspond to a geometric center of the primary winding structure. Correspondingly, an origin of the secondary-sided coordinate system can correspond to a geometric center of the secondary winding structure.

The primary and/or secondary winding structure can comprise at least one subwinding structure. A subwinding structure can be provided by at least one section of the winding structure. In particular, a subwinding structure can provide a loop or a coil, wherein the loop or coil is provided by one or multiple sections of the winding structure. The winding structure can extend along the longitudinal axis of the corresponding coordinate system. Preferably, a winding structure comprises multiple subwinding structures which extend along the longitudinal axis. In this case, successive subwinding structures of the winding structure can be arranged adjacent to one another along said longitudinal axis. Adjacent to each other can mean that central axes of the subwindings, in particular the axes of symmetry, are spaced apart from another, e.g. with a predetermined distance along the longitudinal axis. A loop or coil can be circular-shaped, oval-shaped or rectangular-shaped.

It is possible that the winding structure comprises at least one winding section which extends along the longitudinal axis and at least one winding section which extends along the lateral axis of the corresponding coordinate system. The winding structure, in particular each subwinding structure, can thus be provided by sections extending substantially or completely parallel to the longitudinal axis and sections extending substantially or completely parallel to the lateral axis. In particular, each subwinding can be provided by two sections extending substantially or completely parallel to the longitudinal and two sections extending substantially or completely parallel to the lateral axis.

A first relative pose is determined by at least a first radio direction finding system, wherein the first radio direction finding system comprises at least one transmitting device and at least two receiving devices for receiving a position signal transmitted by the transmitting device. Preferably, the first radio direction finding system comprises exactly four receiving devices. It is, however, also possible that the first radio direction finding system comprises less or more than four receiving devices.

Preferably, the transmitting device is a vehicle-sided transmitting device and the receiving device are primary-sided receiving devices. It is, however, also possible that the transmitting device is a primary-sided transmitting device and the receiving device are vehicle-sided receiving devices.

The first relative pose is determined based on output signals generated be the receiving devices upon reception of the position signal. In the context of this invention, a radio direction finding system denotes a system which allows the determination of a pose of a transmitting device in a desired coordinate system, in particular relative to a receiving device related coordinate system, e.g. in a coordinate system which is fixed with respect to the receiving devices. The pose determination is performed by evaluating the output signals generated by the receiving devices upon reception of the position signal generated by the transmitting device. The transmitting device can be or comprise an antenna element. Further, a receiving device can be or comprise an antenna element. In particular in this case, an output signal can be an output voltage and/or an output current of a receiving device. Such a voltage/current can e.g. be induced within the antenna element upon reception of the position signal. To determine the relative pose, at least one characteristic of the output signal can be evaluated, e.g. an amplitude, a mean value, a frequency or any other signal characteristic.

A relative pose denotes a relative position and/or orientation. A relative pose can be represented by one or multiple parameters. It is e.g. possible to determine the relative pose as the position and/or orientation of the secondary winding structure in a common coordinate system. Preferably, the common coordinate system is provided by the secondary-sided coordinate system. Alternatively, however, the common coordinate system can be e.g. the primary-sided coordinate system or a coordinate system which is arranged fixed in position and fixed in orientation relative to the primary-sided coordinate system. It is, however, also possible to use another common reference coordinate system.

The system can e.g. comprise at least one evaluation unit, in particular at least one primary sided and/or at least one secondary-sided evaluation unit. An evaluation unit can e.g. comprise or be provided by a microcontroller or an integrated circuit. In the context of this invention, the term "secondary-sided" can mean that the respective element is arranged fixed in position relative to secondary-sided coordinate system. In particular, a position of the secondary-sided element in the secondary-sided coordinate system can be known. Also, the term "secondary-sided" can mean that the respective element can be part of the secondary unit. Further, the term "primary-sided" can mean that the respective element is arranged fixed in position relative to the primary-sided coordinate system. In particular, a position and orientation of the primary-sided element in the primary-sided coordinate system is known. Also, the term "primary-sided" can mean that the respective element is part of the primary unit.

Further, at least one motion value of the vehicle is determined. A motion value of the vehicle represents a characteristic of the motion or movement of the vehicle. Such a characteristic can e.g. be an acceleration, a velocity, a distance, e.g. a travelled distance, of the vehicle. Further, such a characteristic can be a yaw rate of the vehicle, a driving direction of the vehicle, a steering wheel angle, e.g. a steering angle or a rear axle steering angle, or any other dynamic characteristic of the vehicle. The characteristic can be related to a longitudinal axis, a lateral axis or a vertical axis of the vehicle.

It is possible that the motion value is measured, in particular by a measuring device, e.g. a sensor. It is, however, also possible that the motion value is determined, e.g. by calculation, from the output signal(s) of at least one measuring device which does not measure said motion value but has an information content related to said motion value. Such a measuring device can e.g. measure a motion value different from the desired motion value.

Such a measuring device can e.g. be a position determination device or system. In this case, the position signal generated by the position determination device can be used to determine the motion value. It is e.g. possible that the measuring device is a GNSS sensor for measuring the position of the vehicle. In this case, said position can provide the motion value. If the motion value is e.g. a velocity value, said velocity value can be determined depending on the position of the vehicle at different points in time.

It is further possible that the measuring device is an image capturing unit, e.g. a camera, more particular a CMOS camera or a CCD camera. The image capturing unit can be attached to the vehicle. Based on an image analysis, in particular of images generated at different points in time, a motion value, e.g. a velocity value, can be determined.

Corresponding image processing algorithms are known to the skilled person.

It is, of course, also possible to use another position determination device or system which determines the position independent from a GNSS position and/or an output of an image capturing unit. Such another position determination device can e.g. provide a Bluetooth RSSI value based position determination, a LIDAR-based position determination or an indoor radar position determination or a position determination according to another functionality.

It is further possible to determine a position by fusing position values determined by at least two different position determination devices or systems. In this case, these different position determination devices or systems provide an estimation according to different principles of operation, i.e. independent from one another, e.g. by evaluating the output signals of different sensors.

The motion value can be determined by a vehicle-sided evaluation unit. In this case, it can be possible that vehicle-sided sensors are used to determine the motion value. Further, the motion value can be transmitted to the primary side, in particular to the primary-sided evaluation unit, e.g. by adequate signal or data transmission means.

It is possible that the system comprises communication means for a communication between a charging unit (primary unit) and the vehicle. The communication means can e.g. configured such that a Bluetooth™-based communication can be established. The communication means allows a data and or a signal communication between primary-sided elements and secondary-sided elements, in particular the vehicle. By means of the communication means, data encoding information on the at least one motion value and all other kinds of information, e.g. on the relative pose determined by a primary-sided evaluation unit and/or trajectory information and/or information on the at least one reference pose and/or a detection of a charging pose and/or parameters of a coordinate transformation may be exchanged between the charging (primary) unit and the vehicle.

Alternatively, the motion value can be determined by a primary-sided evaluation unit. In this case, it can be possible that primary-sided sensors are used to determine the motion value. Alternatively, output signals of vehicle-sided sensors can be transmitted to the primary side, wherein the motion value is determined based on said transmitted output signals by the primary-sided evaluation unit.

According to the invention, the first relative pose is determined using a model-based determination, wherein input values of the model-based determination are provided by the output values of the receiving devices of the first radio direction finding system and the at least one motion value. In this case, the relative pose can be determined as the first relative pose. The output values of the receiving devices and the at least one motion value are jointly considered for the determination of the first relative pose. In other words, the output values of the receiving devices and the at least one motion value are fused to determine the first relative pose.

The output values of the receiving devices of the first radio direction finding system can be provided by an amplitude and/or a real component and/or an imaginary component of an AC voltage induced in the receiving devices upon reception of the position signal. It is therefore possible that the real number and/or the imaginary component and/or the amplitude provide input values for the model-based determination.

The first relative pose can e.g. be determined by the primary-sided evaluation unit. Said evaluation unit can e.g. be connected to the receiving devices by signal transmission means, e.g. wired or wireless signal transmission means.

The model-based determination can be based on a model which represents the relationship between the said output signals and the at least one motion value as input values and the first relative pose as an output value. In this case, the model can describe a direct relationship between said input values and the relative pose. This model can e.g. be a mathematical description of a physical relationship between said input/output values.

It is, however, also possible that the model-based determination can be based on a model which represents the relationship between the said output signals and the at least one motion value as input values and an output value which is different from the first relative pose. In other words, the model does not describe a direct relationship between said input values and the relative pose.

The relative pose can be determined repeatedly, in particular with a predetermined frequency.

The aforementioned joint consideration of both, the output values of the receiving devices of the first radio direction finding system and the at least one motion value, advantageously allows a reliable and accurate determination of the relative pose. The described consideration of the motion value advantageously allows to reduce the inaccuracy of the pose determination by the first radio direction finding system which can e.g. be due to noise, environmental influences such as temperature, and/or electromagnetic interferences.

In a further embodiment, the model-based determination comprises the steps of determining state variables based on the input values, wherein the first relative pose is determined as at least one state variable. In this case, the model can represent a relationship, in particular a mathematical relationship, between the input values and one or more state variable(s). A state variable can e.g. be different from the input value. An input value can also be referred to as observable or measurable value. A state variable, in particular a state variable which represents the first relative pose or encodes information on said first relative pose, is preferably a non-observable state variable.

It is in particular possible to predict (a) state variable(s) based on previously determined state variable(s) and a state transition model and to then update the predicted state variable(s) based on the observation values. Observation values can be provided by the output signals of the receiving devices and the at least one motion value. It is also possible that output values provided by further sources than the receiving devices or the source providing the motion value are used as observation values.

Further, the first relative pose is then determined as one more multiple of said updated (predicted) state variable. Updating can performed by using an observation model. For said model-based determination, the output values generated by the receiving devices and the at least one motion value can provide observation or measurement values.

This advantageously allows a reliable and accurate determination of the relative pose based on the output signals of the first radio direction finding system and the at least one motion value, in particular if the first relative pose can't be determined directly or accurately based on said input values, i.e. provides a so-called hidden or non-observable state variable.

In a preferred embodiment, a Kalman filter is used to determine the first relative pose. This can mean that a Kalman filter-based determination of the first relative pose is performed. The Kalman filter is known to the person skilled in the art. Said Kalman filter-based process uses a model, in particular a system's dynamic model, e.g. based on physical laws of motion, known control inputs to that system (if applicable), and multiple sequential measurements/observations such as from sensors to determine an estimate of the systems state variable(s). Said estimate can be better than the estimate obtained by using only one measurement alone. As such, it is a common sensor fusion and data fusion algorithm. In this case, the output values of the receiving devices and the at least one motion value provide measurements, wherein the first relative pose is a state variable.

The Kalman filter determines an estimate of the state variable(s) of the system as an average of the system's predicted state variable(s) and of the (new) output signals of the receiving devices and the (new) motion value(s) using a weighted average and, if applicable, values from other sources. The purpose of the weights is that values with better (i.e., smaller) estimated uncertainty are "trusted" more.

The weights are calculated from the covariance, a measure of the estimated uncertainty of the prediction of the system's state variable(s). The result of the weighted average is a new state variable(s) estimate that lies between the predicted and measured state, and has a better estimated uncertainty than either alone. This process is repeated at every time step, with the new estimate and its covariance informing the prediction used in the following iteration. This means that the Kalman filter works recursively and requires only the last "best guess", rather than the entire history, of a system's state to calculate a new state.

The Kalman filter-based determination can comprise two steps.

In a prediction step, predicted current state variable(s) will be determined based on the model which is e.g. based on the electromagnetic dipole theory and on the physical laws of motion. In this context, the model can also be denoted as state variable transition model and describes the relationship between (a) predicted current state variable(s) and (a) previous state variable(s), in particular previous estimated state variable(s), and, where appropriate, control input value(s). Further, the predicted current state variable(s) is/are determined based on the process noise parameter which can e.g. be a predetermined or a previously determined noise parameter. Said noise parameter can e.g. be provided by a process covariance, in particular a process covariance matrix. Further to the determination of a predicted current state variable(s), an updated process noise parameter can be determined in the prediction step.

In an update step, the observation values are determined as the output values of the signal receiving devices of the first radio direction finding system and the at least one motion value. An observation noise parameter can be assigned to these observation values, wherein said observation noise parameter represents an amount of uncertainty in the determination of said values. Said observation noise parameter can e.g. be provided by an observation covariance, in particular an observation covariance matrix. Said covariance relative to the covariance of the prediction steps then determines how much the new measurement will affect the updated prediction.

Further, based on said observation values, the predicted current state variable(s) and an observation model which represents the relationship between (a) state variable(s) and the observation values, (an) estimated current state variable(s) is/are determined. Further to the determination of (an) estimated current state variable(s), an updated process noise parameter can be determined in the prediction step.

Then, the first relative pose can be provided by one or more of said current estimated state variable(s) or can be determined depending thereof.

In a further embodiment, a motion value is a velocity of the vehicle, a driving direction of the vehicle or a steering wheel angle of the vehicle. Simulation have shown that such a motion value allows a very precise determination of the relative pose.

In a further embodiment, a further relative pose is determined by a further radio direction finding system, wherein the further radio direction finding system comprises at least one transmitting device and at least two receiving devices for receiving a position signal transmitted by the transmitting device. Further, the second relative pose is determined based on output values generated by the receiving devices upon reception of the position signal.

Aspects related to the first radio direction finding system can also apply to the further radio direction finding system. Therefore, it is referred to the corresponding aspects disclosed in this invention.

The receiving devices of the first and further radio direction finding system can be designed as different or separate devices. Moreover, the transmitting devices of the first and further radio direction finding system can be designed as different or separate devices. Preferably, however, the transmitting device of the first radio direction finding system provides the transmitting device of the further radio direction finding system and vice versa.

In this case, it is e.g. possible that a vehicle-sided transmitting device transmits the position signal, wherein this position signal is received by the receiving devices of the first as well as of the further radio direction finding system.

Further, the relative pose is determined by fusing the first relative pose and the further relative pose. Such a relative pose can be referred to as fused relative pose. This can mean that a resulting pose is determined by combining the first relative pose and the further relative pose, wherein both, the first and the further relative pose are determined by disparate methods and, at least partially, based on the output signals from disparate sensors. This advantageously provides a pose determination with less uncertainty, i.e. with an increased certainty.

In a further embodiment, the relative pose is determined as the first relative pose in a first interval of distances between the winding structures, wherein the relative pose is determined as the fused relative pose in a further interval of distances between the winding structures. A minimum value of the first interval can be higher than a maximum value of the further interval. The minimum value of the first interval can e.g. be 0.5 m, 1.0 m or 2.5 m.

Correspondingly, a maximum value of the further interval can be lower than 0.5 m, 1.0 m or 2.5 m. A maximum value of the first interval can e.g. be 6.5 m. A minimum value of the further interval can e.g. 0 m. Alternatively, a minimum value of the further interval can be higher than a maximum value of the first interval.

This advantageously allows provides an increased certainty of the pose determination only for distances for which the both radio signal finding systems provide a sufficiently precise relative pose, in particular if one of said radio signal finding systems, more particular the further one, does only provide precise results in a predetermined distance interval.

In a further embodiment, the distances of the further distance interval are smaller than the distances of the first distance interval. This advantageously allows provides an increased certainty of the pose determination only for distances for which the further radio signal finding systems provides sufficiently precise relative pose if such a preciseness is only provided for small distances.

In a further embodiment, at least one noise-related parameter of the output values generated be the receiving devices of the first radio direction finding system and at least one noise-related parameter of the output values generated be the receiving devices of the second radio direction finding system is determined, wherein the fused relative pose is determined depending on the noise-related parameters. A noise-related parameter can e.g. represent the amount of noise of said signal relative to the useful signal portion within said signal. In other words, a noise-related parameter can be a SNR. The noise-related parameter can be determined based on an amplitude of an output signal.

The determination of the noise-related parameter can be based on the output signal.

Corresponding methods are known to the skilled persons. Alternatively or in addition, a noise-related parameter can be predetermined or can be determined based on predetermined characteristics of the receiving devices.

It is e.g. possible that the higher the noise of a signal which is represented by said noise-related parameter, the less the relative pose which is determined based on said signal is considered when fusing the first and the further relative pose.

This advantageously further improves the accuracy and certainty of the pose determination.

In a further embodiment, at least the receiving devices of the second radio direction finding system are provided by elements of the device for foreign object detection. Such a device for foreign object detection can e.g. comprise at exactly one or multiple detection winding structure(s). A detection winding structure can e.g. by provided by a coil with exactly one or multiple turns. Such a device for foreign object detection is e.g. disclosed in WO2014/095722 A2 or WO 2012/047779 A1. Further to said detection winding structures, the device for foreign object detection can comprise at least one exciting winding structure.

The object detection device or system can comprise inductive and capacitive elements, wherein these elements can be different from the elements of the resonant circuit of the proposed system. Such elements advantageously allow detecting a foreign object depending on a change of an inductance or capacitance of the aforementioned inductive or capacitive elements. The detection system is designed as an inductive sensing system, wherein the inductive sensing system can comprise one or multiple detection winding(s) and, if applicable, one or more excitation winding(s). Using an inductive detection system, an active or passive detection can be realized. In the case of an active detection, one or more excitation winding(s) and one or more detection winding(s) can be used. An active object detection can be performed by monitoring at least one characteristic properties of an excitation field generated by the excitation winding(s) and received by the detection winding(s). In the case of a passive detection, only one or more passive detection winding(s) are used. The passive object detection is performed by monitoring at least one characteristic of the passive winding(s), in particular an inductance.

In particular, the at least one primary-sided receiving unit can be at least partially provided by or comprise one detection winding structure. Alternatively, the at least one primary-sided receiving unit can be at least partially provided by or comprise one excitation winding structure. Preferably, the detection winding structure can provide a receiving antenna structure of the primary-sided receiving unit. Alternatively or in addition, the primary-sided AD-converter is provided by an AD-converter of the inductive object detection system. In this case, the inductive object detection system can comprise an AD-converter in order to digitize the output signals of one or multiple detection windings.

The inductive object detection system can comprise multiple detection and/or exciting winding structures, wherein these winding structures can be distributed, preferably evenly, across an active area assigned to the primary winding structure. The active area can denote an area covering the primary winding structure. The multiple detection and/or exciting winding structures can e.g. be arranged in an array-like structure.

In this case, at least two selected or all of the detection winding structures of the device for foreign object detection can provide a receiving device of the further radio direction finding system. This advantageously allows to reduce building space requirements for such a system since already existing components can be used for the proposed pose determination.

In a further embodiment, a motion value of the vehicle is determined based GNSS signals and/or image-based and/or based on output values of a vehicle sensor.

In a further embodiment, motion value information are transmitted from the vehicle to a way sided primary unit.

Further proposed is a system for determining a relative pose between a primary winding structure and a secondary winding structure of a system for inductive power transfer to a vehicle, wherein the system comprises at least a first radio direction finding system for determining a first relative pose, wherein the first radio direction finding system comprises at least one transmitting device and at least two receiving devices for receiving a position signal transmitted by the transmitting device, wherein the first relative pose is determined based on output values generated be the receiving devices upon reception of the position signal, wherein at least one motion value of the vehicle is determined. Further, the first relative pose is determined using a model-based determination, wherein input values of the model-based determination are provided by the output values and the at least one motion value.

The system can further comprise at least one means for determining the at least one motion value.

The system advantageously allows to perform a method according to one of the embodiments disclosed in this invention. Thus, the system can be configured to perform such a method.

In a further embodiment, the system comprises a further radio direction finding system for determining a further relative pose, wherein further radio direction finding system comprises at least one transmitting device and at least two receiving devices for receiving a position signal transmitted by the transmitting device, wherein the further relative pose is determined based on output values generated be the receiving devices upon reception of the position signal, wherein the relative pose is determined by fusing the first relative pose and the further relative pose. This and corresponding advantages have been explained before.

In a further embodiment, the system comprises a device for foreign object detection, wherein at least the receiving devices of the further radio direction finding system are provided by elements of the device for foreign object detection. This and corresponding advantages have been explained before.

In a further embodiment, the system comprises means for transmitting motion value information from the vehicle to a way-sided primary unit. This and corresponding advantages have been explained before.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In the following, the same reference numerals denote elements with the same or similar technical features.

Figure 1:
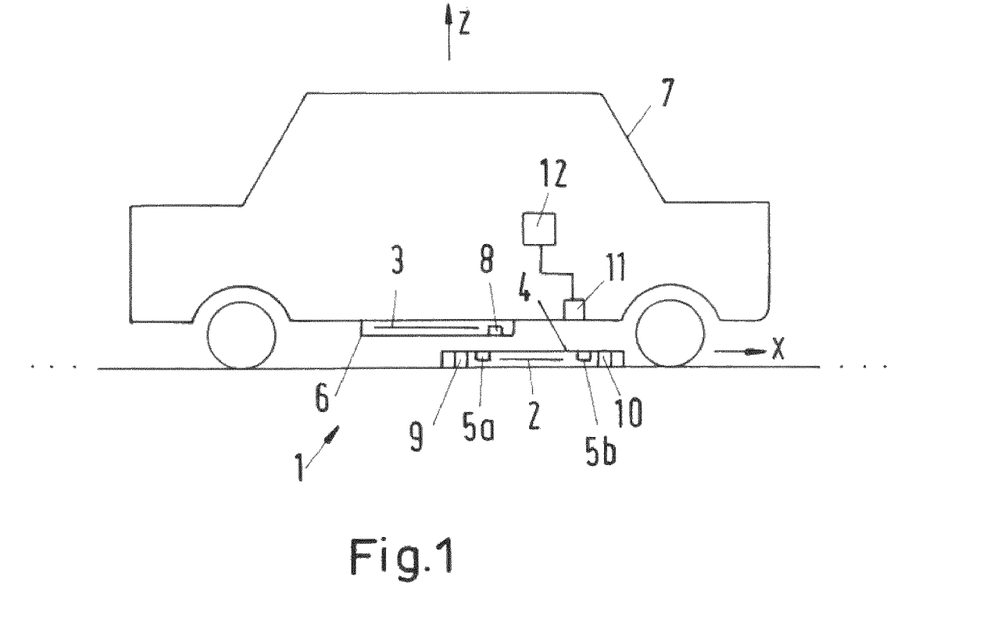
FIG. 1 is a schematic block diagram of a system for determining a relative pose between a primary winding structure and a secondary winding structure of a system for inductive power transfer.

FIG. 1 shows a schematic block diagram of a system 1 for determining a relative pose between a primary winding structure 2 and a secondary winding structure 3 of a system for inductive power transfer.

The system for inductive power transfer comprises a primary unit 4 which comprises the primary winding structure 2. Further, the primary unit 4 comprises a first receiving device 5a and a second receiving device 5b of a first radio direction finding system for determining a relative pose between set primary winding structure 2 and set secondary winding structure 3. Further, the system for inductive power transfer comprises a secondary unit 6 which is attached to a vehicle 7, in particular to a bottom side of the vehicle 7. The secondary unit 6 comprises the secondary winding structure 3. Further, the secondary unit 6 comprises a transmitting device 8 of the first radio direction finding system. The transmitting device 8 can comprise or be designed as an antenna structure. Further, each of the receiving devices 5a, 5b can also be designed as antenna structures or comprise such an antenna structure.

FIG. 1 shows that the first radio direction finding system comprises two receiving devices 5a, 5b. It is, however, possible that the first radio direction finding system comprises more than the shown to receiving devices 5a, 5b, in particular exactly four receiving devices or more than four receiving devices. These receiving devices 5a, 5b can be arranged at different positions with respect to a primary-sided coordinate system.

FIG. 1 shows an embodiment in which different receiving devices 5a, 5b are arranged with a predetermined distance along a longitudinal axis x of the primary-sided coordinate system. Further shown is a vertical axis z of said primary-sided coordinate system. A lateral axis (not shown) is oriented orthogonal to the longitudinal axis x and to the vertical axis z. This lateral axis can be oriented perpendicular to the drawing plane. It is e.g. possible that at least two or all receiving devices 5a, 5b of the primary unit 4 are arranged with a non-zero offset relative to each other along the longitudinal axis x. Alternatively or in addition, at least two or all receiving devices 5a, 5b of the primary unit 4 are arranged with a non-zero offset relative to each other along the lateral axis.

In one embodiment, at least two receiving devices of a first set comprising at least two receiving devices of the primary unit 4 are arranged with a non-zero offset relative to each other along the longitudinal axis x, wherein at least two receiving devices of a further set comprising at least two receiving devices of the primary unit 4 are arranged with a non-zero offset relative to each other along the lateral axis, wherein the first set comprises at least one receiving device which is not part of the further set.

Further, the primary unit 4 can comprise an evaluation unit 9, wherein the evaluation unit 9 can be designed as or comprise a microcontroller or an integrated circuit. This evaluation unit 9 can be connected to the receiving devices 5a, 5b by adequate signal transmission means, e.g. by a wire or by a wireless connection. By means of the evaluation unit 9, the first relative pose is determined depending on the output signals generated by the receiving devices 5a, 5b, in particular depending on at least one characteristic of said output signals. Such a process for the determination of the relative pose depending on the output signals are known to the skilled person.

Further, the primary unit 4 comprises a data receiving means 10 for receiving data signals transmitted by a vehicle-sided data transmitting means 11 in a wireless manner, e.g. via a Bluetooth™-based communication. In particular, a communication link can be established between the vehicle-sided data transmitting means 11 and the primary-sided data receiving means 10. The transmitting and receiving means can each comprise at least one antenna structure.

Further shown is a vehicle-sided control unit 12. By means of the vehicle-sided control unit 12 and the data transmitting means 11, at least one motion value of the vehicle 7 can be transmitted to the primary unit 4 by a corresponding data signal. Such a motion value can e.g. be the velocity of the vehicle 7 which can e.g. be determined by a velocity sensor (not shown), wherein said velocity sensor can be connected to the shown control unit 12.

Alternatively or in addition, the at least one motion value can comprise information on the driving direction of the vehicle 7, in particular in the world coordinate system. Further alternative or in addition, the at least one motion value can comprise or be provided by the steering wheel angle of the vehicle 7, wherein such a steering wheel angle can e.g. be determined by a sensor (not shown).

Further, the first relative pose is determined by the primary-sided evaluation unit 9 using a model-based determination, wherein input values of the model-based determination are provided by the output values of the receiving devices 5a, 5b and the at least one motion value which is transmitted from the vehicle 7 to the primary unit 4, in particular from the vehicle-sided control unit 12 to the primary-sided evaluation unit 9. The primary-sided evaluation unit 9 can be connected to the data receiving means 10 by adequate connecting means, e.g. in a wired or in a wireless manner.

It is also possible that the motion value, e.g. a velocity, of the vehicle 7 is determined based on the GNSS signal which is e.g. provided by a GNSS sensor (not shown) of the vehicle 7. The motion value can be determined by the vehicle-sided control unit 12 and be transmitted to the primary side, in particular to the primary-sided evaluation unit 9. Alternatively, the at least one motion value can be determined by the primary-sided evaluation unit 9, wherein signals for said determination are provided to the evaluation unit 9, e.g. by the vehicle 7, in particular by the vehicle-sided control unit 12.

Figure 2:
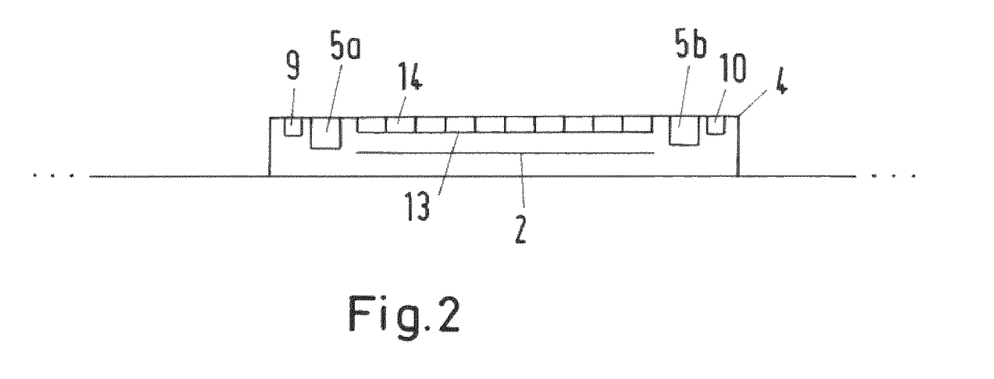
FIG. 2 is a schematic block diagram of parts of system for determining a relative pose between a primary winding structure and a secondary winding structure of a system for inductive power transfer according to another embodiment.

FIG. 2 shows a schematic block diagram of parts of system for determining a relative pose between a primary winding structure 2 and a secondary winding structure 3 of a system for inductive power transfer according to another embodiment.

In FIG. 2, only the primary unit 4 of the system for inductive power transfer is shown. The primary unit 4 is essentially designed as the primary unit 4 shown in FIG. 1 and therefore, reference is made to the corresponding description. In contrast to the embodiment shown in FIG. 1, the primary unit 4 comprises an array 13 of detection windings 14 of a device for foreign object detection. For the ease of illustration, only one of the detection windings 14 is provided with a reference. Such a detection winding 14 can provide an antenna element for receiving a position signal, in particular the position signal generated and transmitted by the position signal transmitting device 8 (see FIG. 1). In this case, the position signal transmitted by the transmitting device 8 is received by the receiving devices 5a, 5b of the first radio direction finding system as well as by the detection windings 14 of the device for foreign object detection. Consequently, these detection windings 14 and the transmitting device 8 provide a further radio direction finding system for determining a relative pose between the primary winding structure 2 and the secondary winding structure 3.

The evaluation unit 9 can be connected to the detection windings 14 by adequate signal transmission means, e.g. by a wire or by a wireless connection. By means of the evaluation unit 9, the further relative pose is determined depending on the output signals generated by the detection windings 14, in particular depending on at least one characteristic of said output signals. Such a process for the determination of the relative pose depending on the output signals are known to the skilled person.

It is further possible to then determine a resulting relative pose by fusing the aforementioned first relative pose which is determined depending on the at least one motion value and the output signals generated by the receiving devices 5a, 5b of the first radio direction finding system and the further relative pose which is determined depending on the output signals generated by the detection windings 14 which provide receiving devices of the further radio direction finding system. This means that both, the first and the further relative pose is considered when determining the resulting relative pose.

Figure 3:
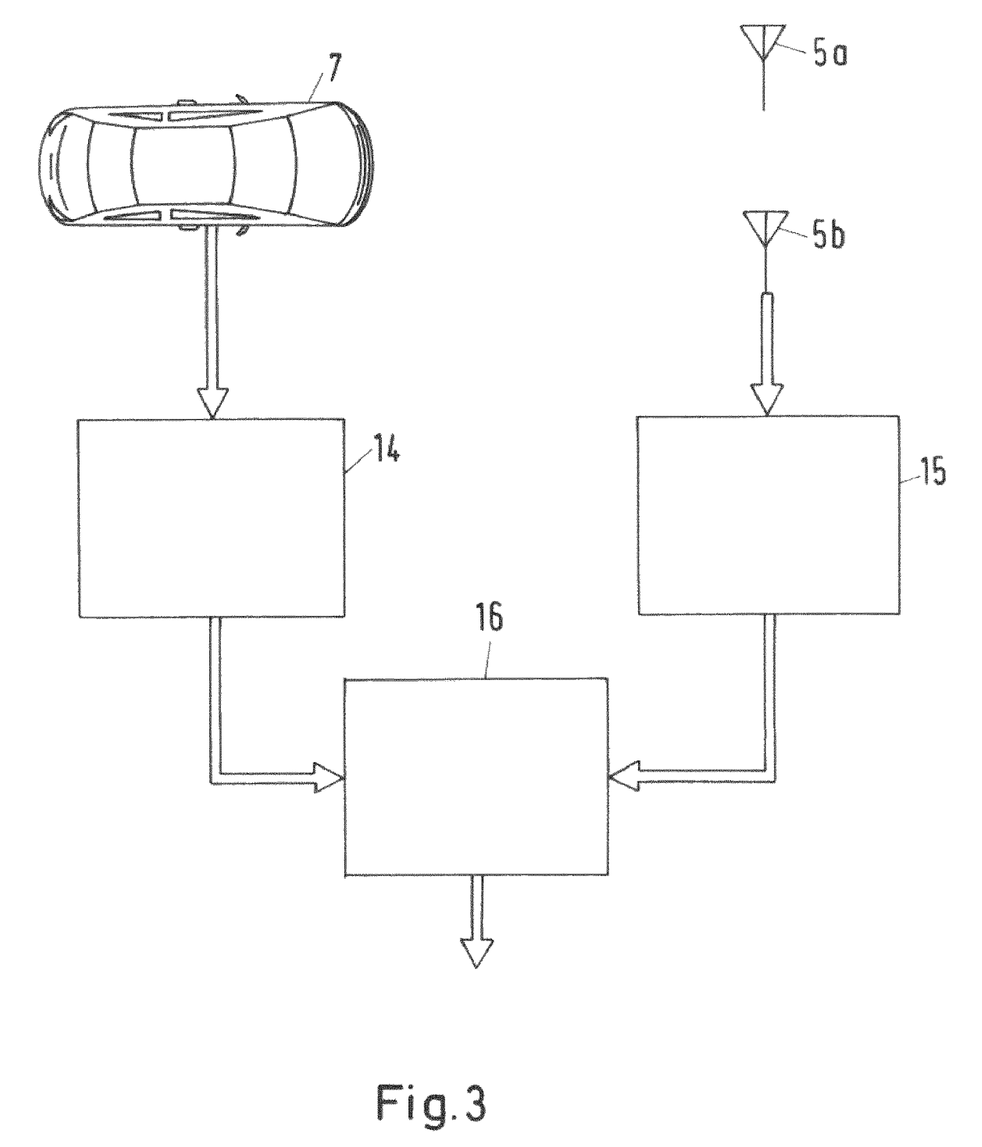
FIG. 3 is a schematic flow diagram of a method for determining a relative pose between a primary winding structure and a secondary winding structure.

FIG. 3 shows a schematic flow diagram of a method for determining a relative pose between a primary winding structure and a secondary winding structure.

Shown is the vehicle 7, wherein at least one motion value, in particular a speed value, a driving direction value and/or a steering wheel angle value, is determined in a motion value determining step 14. Further shown are receiving devices 5a, 5b of the first radio direction finding system, wherein the output values of said receiving devices 5a, 5b are determined in the output value determining step 15. The values determined in the steps 14, 15 are provided to a model-based determination of the relative pose between the primary winding structure 2 and the secondary winding structure 3, in particular as input values. In a determination step 16, said relative pose is determined.

Figure 4:
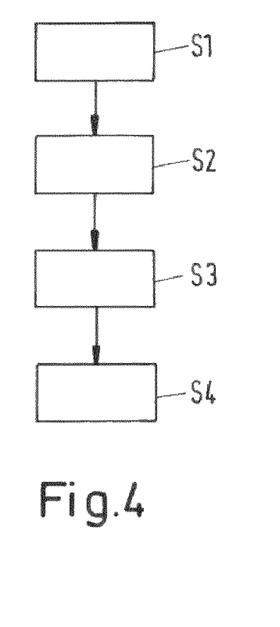
FIG. 4 is a schematic flow diagram of a method for determining a relative pose between a primary winding structure and a secondary winding structure according to another embodiment of the invention.

FIG. 4 shows a schematic flow diagram of a method for determining a relative pose between a primary winding structure 2 and a secondary winding structure 3 according to another embodiment of the invention. In the first step S1, the position signal is generated and transmitted, e.g. by a vehicle-sided transmitting device 8 of the first radio direction finding system. In a second step S2, output values of receiving devices 5a, 5b of said first radio direction finding system our determined. In third step S3, at least one motion value of the vehicle 7 (see FIG. 1) is determined. In a fourth step S4, a first relative pose is determined using a model-based determination, wherein the input values of said model-based determination are provided by the values determined in the second and the third step S2, S3.

It is e.g. possible that the first relative pose is determined as an output of the model-based determination, wherein the model represents a relationship between the input values and the first relative pose. It is, however, also possible that the model represents a relationship between the input values and an output which is different from the first relative pose. In this case, the model can be used to determine the first relative pose as state variables, wherein the model describes a relationship between the input values and the state variables as well as the relationship between the state variables and an output of the model, in particular an observable or measurable output of the model. In particular in this case, the first relative pose can be determined as a non-observable/non-measurable state variable or depending on at least one such non-observable/non-measurable state variable.

The model can e.g. be a recursive model. In particular, the model can be provided such that the common feature-based determination of the relative pose is enabled. In this case, the model can e.g. provide a so-called state variable transition model which describes or represents the relationship, in particular a mathematical relationship, between the state variables at two different points in time. Further, the model can provide a so-called observation model which represents the relationship between state variables and the observation values, namely the at least one motion value and the output values of the receiving devices 5a, 5b. In a first sub step of the fourth step S4, predicted state variables can be determined by using the state variable transition model which is fed by previously determined estimated state variables, in particular state variables estimated at a previous point in time. In a second sub step of the fourth step S4, updated estimated state variables can be determined based on the predicted state variables determined in the first sub step and the observation values, in particular using the above-mentioned observation model. These updated estimated state variables then provide the aforementioned previously determined estimated state variables for the next sequence of steps S1 to S4.

The relative pose can be determined repeatedly, in particular with a predetermined frequency. This can be done by repeatedly performing the sequence of steps S1 to S4.

Figure 5:
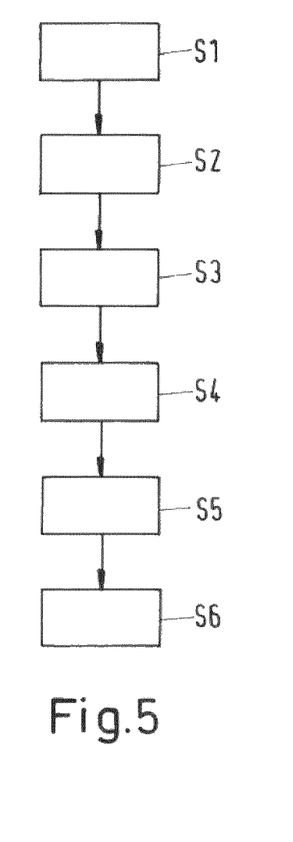
FIG. 5 is a schematic flow diagram of a method for determining a relative pose between a primary winding structure and a secondary winding structure according to another embodiment of the invention.

FIG. 5 shows a schematic flow diagram of a method for determining a relative pose between a primary winding structure 2 and a secondary winding structure 3 according to another embodiment of the invention. The sequence of the first step S1 to the fourth step S4 corresponds to the sequence illustrated in FIG. 4. Therefore, reference is made to the corresponding description. In fifth step S5, of further relative pose is determined based on output values generated by the receiving devices of the further radio direction finding system, e.g. by detection windings 14 of a foreign object detection system (see FIG. 2). In a six step S6, the relative pose, which can also be denoted as fused relative pose or resulting relative pose, is determined by fusing the first relative pose determined in the fourth step S4 and the further relative pose determined in the fifth step S6. Fusing can e.g. be performed by determining a mean value of the first and further relative pose, in particular a weighted mean value of said poses. It is e.g. possible to determine a noise-related parameter of the output signals provided by the receiving devices 5 a, 5B of the first radio direction finding system and of the receiving devices of the further radio direction finding system which represent the noise portion of said output signals, in particular in relation to the useful signal portion, and then determine the fused relative pose depending on these noise related parameters. In particular, a weight of the first or further relative pose in the determination of the weighted mean value can increase with a decreasing noise value.

Figure 6:
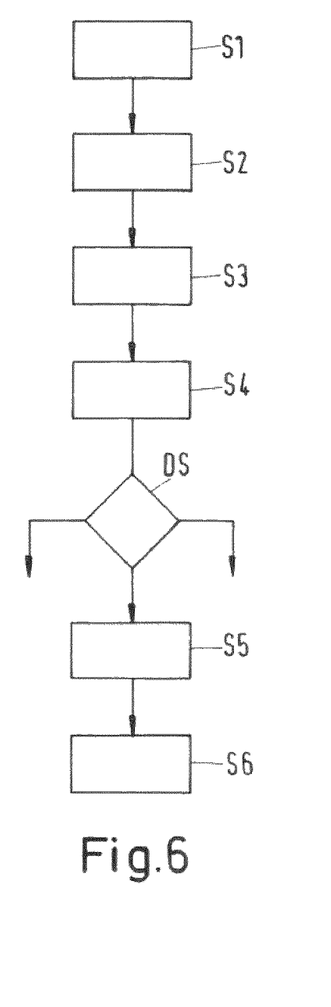
FIG. 6 is a schematic flow diagram of a method for determining a relative pose between a primary winding structure and a secondary winding structure according to another embodiment of the invention.

FIG. 6 shows a schematic flow diagram of a method for determining a relative pose between primary winding structure 2 and a secondary winding structure 3 according to another embodiment of the invention. The sequence of the first step S1 to the fourth step S4 corresponds to the sequence illustrated in FIG. 4. Therefore, reference is made to the corresponding description. The sequence of the fifth step S5 to the sixth step S6 corresponds to the sequence illustrated in FIG. 5. Therefore, reference is made to the corresponding description. In contrast to the embodiment shown in FIG. 4, the method comprises the decision step DS. In the decision step, a distance between the primary winding structure 2 and the secondary winding structure 3 is determined, in particular depending on the first relative pose determined in the fourth step S4. If this distance value is within a first distance interval, the relative pose is determined as this first relative pose. If this distance value is within a further distance interval, the sequence of the fifth and the six step S5, S6 is performed and the relative pose is determined as the fused relative pose as outlined above. If this distance value is neither within the first nor the further distance interval, no relative pose is determined and an out of range information is generated. The distance values of the first distance interval can be higher than the distance values of the further distance interval.

The sequence of steps S1, S6 shown in the FIGS. 4 to 6 do not necessarily define the time sequence of said steps S1, S6. It is in particular possible that the at least one motion value which is determined in the third step S3 is determined simultaneously to the output values of the receiving devices 5a, 5b determined in the second step S2. It is further possible that the output values of the receiving devices of the further radio direction finding system which are determined in the fifth step S5 are determined simultaneously to the determination performed in the second step S2 and/or the determination performed in the third step S3. It is further possible that the determination of the first relative pose in the fourth step S4 is performed simultaneously to the determination of the further relative pose in the six step S6.

The phrase "at least one of A, B, and C" should be construed to mean a logical (A OR B OR C), using a non-exclusive logical OR, and should not be construed to mean "at least one of A, at least one of B, and at least one of C."

The invention claimed is:

1. A method for determining a relative pose between a primary winding structure and a secondary winding structure of a system for inductive power transfer to a vehicle, the method comprising:
    obtaining first output values generated by a plurality of receiving devices of a first radio direction finding system, wherein the first radio direction finding system further includes a transmitting device and wherein the plurality of receiving devices generates the output values in response to receiving a position signal transmitted by the transmitting device;
    determining a motion value of the vehicle;
    providing the obtained first output values and the motion value as input values to a model;
    determining a first relative pose based on the model; and
    determining the relative pose based on the first relative pose.

2. The method of claim 1 wherein:
    determining the first relative pose based on the model includes determining state variables based on the input values; and
    the first relative pose is determined based on at least one state variable.

3. The method of claim 2 wherein the first relative pose is determined based on exactly one state variable.

4. The method of claim 3 wherein the exactly one state variable is used as the first relative pose.

5. The method of claim 1 wherein a Kalman filter is used to determine the relative pose.

6. The method of claim 1 wherein the motion value is at least one of a velocity of the vehicle, a driving direction of the vehicle, and a steering wheel angle of the vehicle.

7. The method of claim 1 further comprising:
    obtaining second output values generated by a plurality of second receiving devices of a second radio direction finding system, wherein the second radio direction finding system further includes a second transmitting device and wherein the plurality of second receiving devices generates the second output values in response to receiving a second position signal transmitted by the second transmitting device;
    determining a further relative pose based on the obtained second output values; and selectively fusing the first relative pose and the further relative pose to generate a fused relative pose and determine the relative pose.

8. The method of claim 7 wherein the fused relative pose is selectively used as the relative pose.

9. The method of claim 7 wherein:
in a first interval of distances between the primary and secondary winding structures, the first relative pose is used as the relative pose;
in a second interval of distances between the primary and secondary winding structures, the fused relative pose is used as the relative pose; and
the first and second intervals are non-overlapping.

10. The method of claim 9 wherein the distances of the second interval are smaller than the distances of the first interval.

11. The method of claim 7 further comprising:
determining a first noise-related parameter of the obtained first output values; and
determining a second noise-related parameter of the obtained second output values,
wherein the fused relative pose is determined based on the noise-related parameters.

12. The method of claim 7 wherein the plurality of second receiving devices is provided by elements of a device for foreign object detection.

13. The method of claim 1 wherein the motion value is determined based on at least one of Global Navigation Satellite System (GNSS) signals, signals from an image sensor, and output values of a vehicle sensor.

14. The method of claim 1 further comprising transmitting information based on the motion value to a way-sided primary unit.

15. A system for determining a relative pose between a primary winding structure and a secondary winding structure of a system for inductive power transfer to a vehicle, the system comprising:
a first radio direction finding system including a transmitting device and a plurality of receiving devices configured to generate first output values in response to receiving a position signal transmitted by the transmitting device; and
a controller configured to:
determine a motion value of the vehicle;
determine a first relative pose using a model-based determination; and
determine the relative pose based on the first relative pose,
wherein the first output values and the motion value are input values of the model-based determination.

16. The system of claim 15 further comprising:
a second radio direction finding system including a second transmitting device and a plurality of second receiving devices configured to generate second output values in response to receiving a second position signal transmitted by the second transmitting device,
wherein the controller is configured to determine a further relative pose based on the second output values of the second radio direction finding system, and
wherein the relative pose is selectively determined by fusing the first relative pose and the further relative pose.

17. The system of claim 16 further comprising:
a device for foreign object detection,
wherein the plurality of second receiving devices is provided by elements of the device for foreign object detection.

18. The system of claim 15 wherein the system is configured to transmit information based on the motion value from the vehicle to a way-sided primary unit.

* * * * *